United States Patent
Takabatake

[11] Patent Number: 5,829,482
[45] Date of Patent: Nov. 3, 1998

[54] METHOD OF PLUGGING UP COATING MATERIAL INTRODUCTION APERTURES FORMED IN HOLLOW STRUCTURAL MEMBER AND PLUGS USED IN PERFORMING SUCH METHOD

[75] Inventor: Yoshihiro Takabatake, Aichi-ken, Japan

[73] Assignee: NEO-EX Lab., Inc., Aichi-Ken, Japan

[21] Appl. No.: 689,072

[22] Filed: Jul. 30, 1996

[30] Foreign Application Priority Data

Aug. 8, 1995 [JP] Japan ................................ 7-202428

[51] Int. Cl.⁶ ...................................................... F16L 55/10
[52] U.S. Cl. .................................. 138/89; 138/94; 138/97
[58] Field of Search ................................ 138/89, 94, 97; 296/203, 204, 205, 208

[56] References Cited

U.S. PATENT DOCUMENTS

| | | | |
|---|---|---|---|
| 4,989,913 | 2/1991 | Moore, III | 138/89 X |
| 5,213,391 | 5/1993 | Takagi | 296/205 |
| 5,320,460 | 6/1994 | Murakami et al. | 138/89 X |
| 5,327,942 | 7/1994 | Black | 138/89 |
| 5,622,211 | 4/1997 | Martin et al. | 138/89 X |

*Primary Examiner*—William Stryjewski
*Attorney, Agent, or Firm*—Dennison, Meserole, Pollack & Scheiner

[57] ABSTRACT

A method of plugging up a coating material introduction aperture formed on a hollow structural member, the hollow structural member being coated with a coating material through dip coating and then heated to bake the coating material coated thereon, which includes the steps of providing a plug having a coating material introduction passage and formed of a foamable material which is foamable by heat at the time the hollow structural member is heated to bake the coating material coated thereon, inserting the plug as unfoamed into the coating material introduction aperture before the hollow structural member is coated with the coating material through the dip coating, and heating the plug to produce a foamed product so as to plug up the coating material introduction aperture. The step of heating the plug is performed by heat which is applied to the hollow structural member for baking the coating material coated thereon.

7 Claims, 2 Drawing Sheets

METHOD OF PLUGGING UP COATING MATERIAL INTRODUCTION APERTURES FORMED IN HOLLOW STRUCTURAL MEMBER AND PLUGS USED IN PERFORMING SUCH METHOD

BACKGROUND OF THE INVENTION

1. Field of the Invention

The present invention relates to a method of plugging up coating material introduction apertures formed in a hollow structural member, such as a pillar, a rocker panel, a roof side panel and a hood panel of a vehicle body, and plugs used in performing such a method.

2. Description of the Prior Art

Conventionally, a hollow structural member of a vehicle body is coated with a coating material through dip coating and is then heated to bake the coating material coated thereon. As will be appreciated, the coating material has to be coated on not only an outer surface of the hollow structural member but also an inner surface of the hollow structural member. To apply the coating material on the inner surface of the hollow structural member during dip coating, the hollow structural member is appropriately provided with a plurality of coating material introduction apertures which may permit entrance of the coating material into a cavity of the hollow structural member.

The automobile body to be treated is first dipped in a coating bath filled with the coating material for dip coating. During dip coating, the coating material is coated on the outer surface of the hollow structural member. Simultaneously, the coating material enters the cavity through the coating material introduction apertures and is also coated on the inner surface of the hollow structural member. The automobile body is then heated in a baking machine to bake the coating material coated thereon. After completion of baking of the coating material, the coating material introduction apertures are preferably plugged up with plugs to prevent generation of abnormal sounds and entrance of water and dust therethrough.

However, the coating material introduction apertures have to be suitably located so that the coating material introduced into the cavity therethrough is uniformly coated on the inner surface of the hollow structural member. As a result, some of the coating material introduction apertures have to be formed in such positions that they cannot be plugged up with the plugs. These coating material introduction apertures are left without being plugged up by the plugs. This causes generation of abnormal sounds and entrance of water and dust into the cavity of the hollow structural member.

Further, the conventional plugs have a disadvantage that these may be easily slipped off from the coating material introduction apertures.

SUMMARY OF THE INVENTION

It is an object of the invention to provide a method of surely plugging up coating material introduction apertures formed in a hollow structural member even if the coating material introduction apertures are formed in such positions that they cannot be plugged up with plugs, and improved plugs used in performing such a method.

In order to attain these objects, the present invention provides a method of plugging up a coating material introduction aperture formed on a hollow structural member, the hollow structural member being coated with a coating material through dip coating and then heated to bake the coating material coated thereon, which includes the steps of providing a plug having a coating material introduction passage and formed of a foamable material which is foamable by heat at the time the hollow structural member is heated to bake the coating material coated thereon, inserting the plug as unfoamed into the coating material introduction aperture before the hollow structural member is coated with the coating material through the dip coating, and heating the plug to produce a foamed product so as to plug up the coating material introduction aperture, the step of heating the plug being performed by heat which is applied to the hollow structural member for baking the coating material coated thereon.

With this method, the plug is previously provided in the coating material introduction aperture of the hollow structural member. Then, the plug is foamed and expanded in the coating material introduction aperture when the hollow structural member is heated for baking the coating material coated thereon. Thus, the coating material introduction aperture can be reliably plugged up regardless of the position thereof.

In order to attain these objects, the present invention also provides a plug for plugging up a coating material introduction aperture formed on a hollow structural member, the hollow structural member being coated with a coating material through dip coating and then heated to bake the coating material coated thereon, which includes a plug body adapted to be received in the coating material introduction aperture, the plug body having a coating material introduction passage formed therethrough and being formed of a foamable material which is foamable by heat at the time the hollow structural member is heated to bake the coating material coated thereon.

The plug can be previously provided in the coating material introduction aperture of the hollow structural member since it has a coating material introduction passage. Also, the plug can be foamed and expanded in the coating material introduction aperture to plug up the same when the hollow structural member is heated to the coating material coated thereon. Thus, the plug can be used in performing the method of the present invention.

The plug body of the plug may includes a head integrally provided on an upper end portion of the plug body so as to increase plugging capability of the plug.

The plug body of the plug may be provided with expanding slots so that the plug is easily mounted in the coating material introduction aperture.

The plug body of the plug may be provided with an annular engagement groove which is dimensioned to engage the periphery of the coating material introduction aperture, so that the plug is prevented from slipping off from the coating material introduction aperture.

The present invention will become more fully apparent from the following description as it proceeds in connection with the drawings.

DETAILED DESCRIPTION OF THE PREFERRED EMBODIMENT

A preferred embodiment of the invention will now be described in detail with reference to the drawings.

Figure 3:
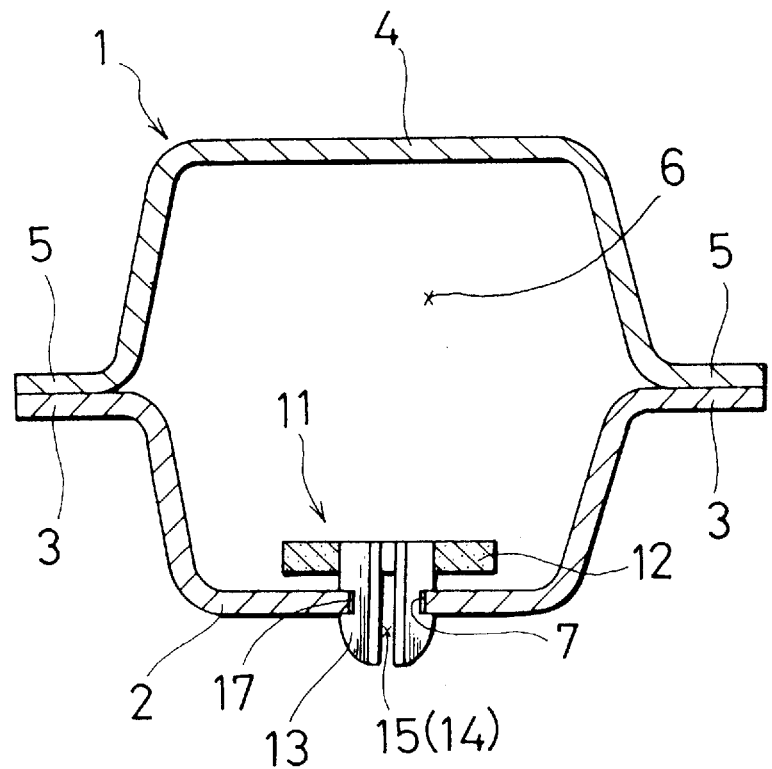
FIG. 3 is a sectional view of the plug as received in a coating material introduction aperture formed in a pillar before the plug is foamed and expanded.

As shown in FIG. 3, a pillar 1 of a vehicle body is exemplified as a hollow structural member. The pillar 1 is constituted of an inner pillar panel 2 having a flange 3 and an outer pillar panel 4 having a flange 5. The inner and the outer pillar panels 2 and 4 are welded at the flanges 3 and 5 by spot welding to form the pillar 1 into a closed box-like hollow body including a cavity 6 therein. The inner pillar panel 2 is provided with a plurality of apertures 7. Further, the apertures 7 are used as coating material introduction apertures through which a coating material is introduced into the cavity so that the coating material is coated on the inner surface of the pillar when the vehicle body is coated with the coating material through dip coating. Each aperture 7 is provided with a plug 11.

The plug 11 is made of a foamable material which may be foamed and expanded to a foamed product 21 (FIG. 4) by heat at the time the pillar 1 is heated to bake the coating material coated thereon, for example, at temperatures from 110° C. to 190° C. The foamable material may be a foamable material disclosed in Japanese Laid-Open Patent Publication No. 2-276836. As will be appreciated, the foamable material is not restricted to such a material and may be various types of materials which can be foamed and expanded by heat at the time the pillar 1 is heated to bake the coating material coated thereon, such as synthetic resin and rubber each containing a foaming agent.

Figure 1:
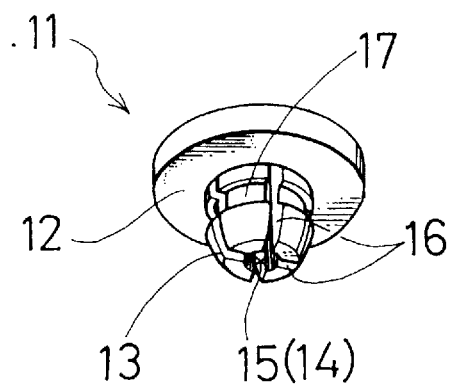
FIG. 1 is a perspective view of a plug according to an embodiment of the present invention.
Figure 2:
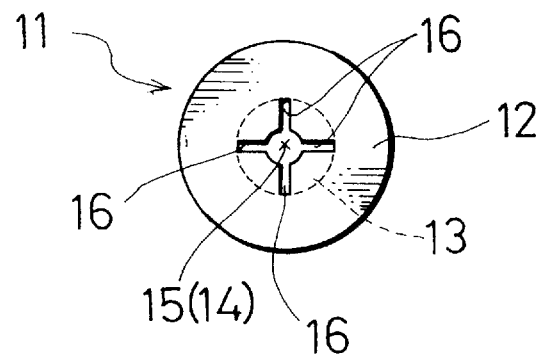
FIG. 2 is a plan view of the plug of FIG. 1.

As shown in FIGS. 1 and 2, the plug 11 is constituted of a cylindrical plug body 13 adapted to be elastically received in the aperture 7, and an annular head 12 integrally formed on an upper end portion of the plug body 13 and having a diameter greater than that of the aperture 7. The plug 11 is generally integrally formed by injection molding of the foamable material.

The plug body 13 of the plug 11 is provided with a longitudinal central through bore 15 formed therethrough which may act as a coating material introduction passage 14. The through bore 15 longitudinally extends along the plug body 13. As best shown in FIG. 2, the plug body 13 includes a plurality (four is shown for illustration purposes) of longitudinal expanding slots 16 extending along the entire length of the through bore 15. The expanding slots 16 radially extend from the through bore 15 and split or divide the plug body 13 to four longitudinal plug sections. Thus, the expanding slots 16 permit the plug body 13 to be elastically spread and narrowed. Further, as will be easily understood, the expanding slots 16 may act as a part of the coating material introduction passages 14.

The plug body 13 of the plug 11 is tapered at a lower end portion thereof so as to be easily inserted into the aperture 7. Further, the plug body 13 is provided with an annular engagement groove 17 on the outer circumferential surface thereof. The engagement groove 17 is dimensioned to engage the periphery of the aperture 7. Also, the engagement groove 17 is preferably located so that the head 12 is spaced from the inner panel 2 by a desired distance when the engagement groove 17 engages the periphery of the aperture 7 (FIG. 1).

The plug 11 thus formed completely plugs up the aperture 7 when it is foamed and expanded by heating.

Processes for incorporating the plug 11 to the pillar 1 and subsequent operations will now be described.

Figure 5:
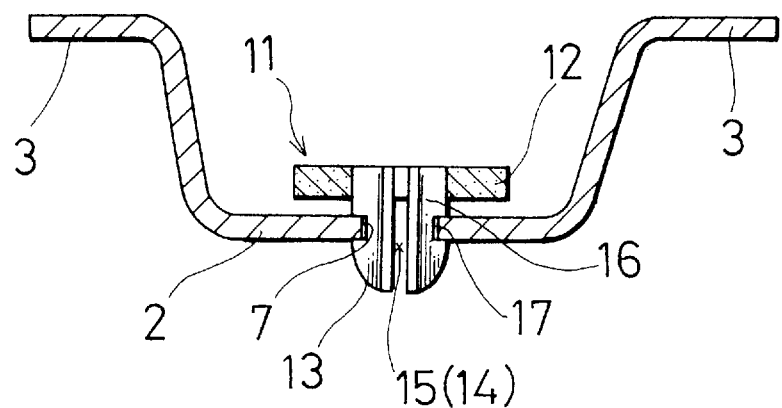
FIG. 5 is a sectional view similar to FIG. 3 before an outer pillar panel is welded to an inner pillar panel.

As shown in FIG. 5, the plug body 13 of the plug 11 is inserted into the aperture 7 of the inner panel 2. The plug body 13 can be easily inserted into the aperture 7 since the expanding slots 16 function to elastically narrow the plug body 13. Further, the annular groove 17 can reliably engage the periphery of the aperture 7 since the plug body 13 is spread by spring action due to an elastic restoring force thereof when the annular groove 17 aligns to the periphery of the aperture 7, so that the plug 11 is reliably retained in the aperture 7. Thus, the plug 11 as unfoamed is previously mounted in the aperture 7 of the inner panel 2.

Subsequently, as shown in FIG. 1, the inner and the outer pillar panels 2 and 4 are welded at the flanges 3 and 5 thereof by spot welding to form the pillar 1 having the closed box-like hollow shape.

Thereafter, the automobile body is cleaned or degreased in a cleaning bath and is then coated with the coating material in a coating bath for dip coating. During dip coating, the coating material is coated on the outer surface of the pillar 1. Simultaneously, the coating material enters the cavity 6 through the through bore 15 and the expanding slots 16 and is also coated on the inner surface of the pillar 1.

Figure 4:
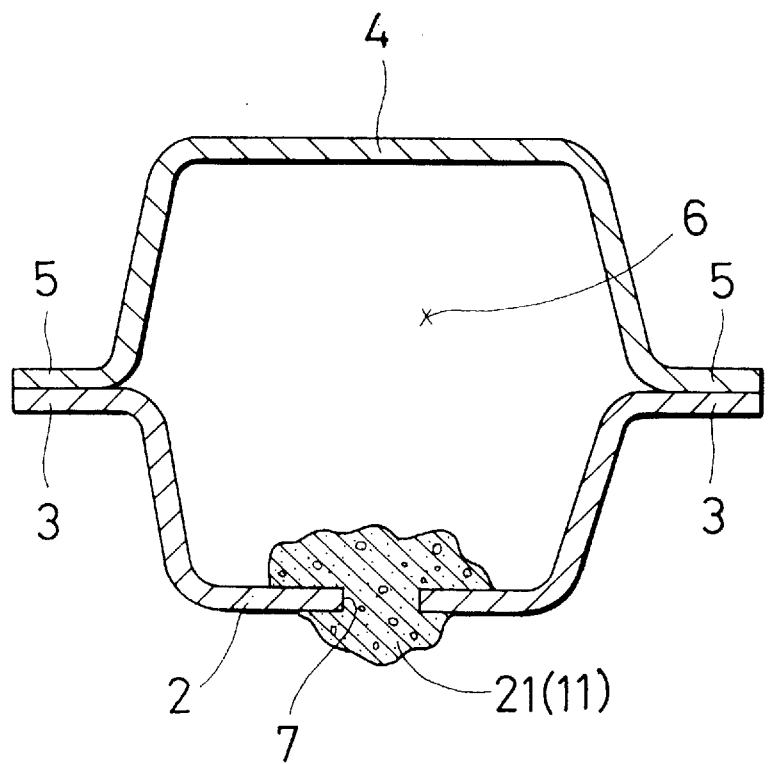
FIG. 4 is a sectional view of the plug as received in a coating material introduction aperture formed in a pillar after the plug is foamed and expanded.

The automobile body is then heated in a baking machine to bake the coating material coated thereon. When the automobile body is heated to bake the coating material coated thereon, as shown in FIG. 4, the plug 11 is foamed and expanded to the foamed product 21 by heat applied to the automobile body. The foamed product 21 thus produced is reliably adhered to the inner and outer surface of the inner panel 2 around the aperture 7 for completely sealing up the aperture 7.

The plug 11 according to the present invention can be previously plugged in the aperture 7 before the automobile body is heated to bake the coating material coated thereon. Thus, the plug 11 may plug up the aperture 7 formed on the pillar 1 regardless of the position of the aperture 7. Additionally, the plug 11 may eliminate a disadvantage in a conventional plug that the conventional plug may be accidentally slipped off from an aperture into which it is inserted. This is because that the plug 11 of the present invention is foamed and adhered to the pillar 1.

Further, the plug 11 in the embodiment described above may be preferably modified. For example, although the plug 11 in the embodiment described above is provided with the annular head 12, such a head 12 may be omitted, if required. As will be easily understood, if the plug 11 does not include the head 12, the expanding slots 16 are not extended along the entire length of the through bore 15 and terminates near the upper end portion of the plug body 13.

The preferred embodiment herein described is intended to be illustrative of the invention and not to limit the invention to the precise form herein described. It is chosen and described to explain the principles of the invention and their application and practical use to enable others skilled in the art to practice the invention.

What is claimed is:

1. A method for coating exterior and interior surfaces of a hollow structural member having an aperture through a wall thereof, comprising the steps of:

providing a plug comprising an aperture therethrough and formed of an unfoamed, heat foamable material;

inserting said plug in said aperture of the hollow structural member such that said plug is retained therein;

dip coating said hollow structural member with said plug retained in said aperture in a coating material, such that coating material coats the exterior surface and flows through the aperture in said plug to coat said interior surface;

heating the coated hollow structural member to bake the coating material coated thereon, said heating causing foaming of said plug formed of unfoamed, heat foamable material, thereby closing the aperture in the hollow structural member and the aperture in the plug.

2. A method according to claim 1, additionally comprising disposing a plurality of expanding slots radially from the aperture of the hollow structural member, said slots elastically narrowing the plug body upon said inserting.

3. A method according to claim 1, additionally comprising disposing an annular engagement groove on an outer circumferential surface of the plug body, and engaging the groove with the aperture through the wall upon said inserting.

4. A plug for closing an aperture in a wall of a hollow structural member, comprising a plug body formed of an unfoamed, heat foamable material having an aperture therethrough, said aperture therethrough including a plurality of expanding slots extending therealong, said plug being adapted for retention in the aperture of the hollow structural member, the aperture of said plug body being closable by application of heat to foam said unfoamed, heat foamable material.

5. The plug as defined in claim 4, wherein said plug body includes a head integrally provided on an upper end portion thereof.

6. The plug as defined in claim 4, wherein said plug body is provided with an annular engagement groove on the outer circumferential surface thereof, said engagement groove being dimensioned to engage the periphery of the coating material introduction aperture.

7. The plug as defined in claim 4, wherein said plug body is provided with an annular engagement groove on an outer circumferential surface thereof, said engagement groove being dimensioned to engage the aperture in the wall of the hollow structural member at a peripheral portion of the aperture in the wall.

\* \* \* \* \*